United States Patent
Yuen et al.

(10) Patent No.: US 7,022,308 B1
(45) Date of Patent: Apr. 4, 2006

(54) PREPARATION OF MOLECULAR SIEVE SSZ-33

(75) Inventors: Lun-Teh Yuen, San Francisco, CA (US); Stacey Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/947,848

(22) Filed: Sep. 22, 2004

(51) Int. Cl.
*C01B 39/48* (2006.01)
(52) U.S. Cl. ..................................................... 423/706
(58) Field of Classification Search ................ 423/706, 423/718
See application file for complete search history.

(56) References Cited

U.S. PATENT DOCUMENTS

| | | | |
|---|---|---|---|
| 4,963,337 A | | 10/1990 | Zones |
| 5,281,407 A | * | 1/1994 | Nakagawa .................. 423/706 |
| 5,707,600 A | | 1/1998 | Nakagawa et al. |
| 5,707,601 A | | 1/1998 | Nakagawa |
| 5,785,947 A | | 7/1998 | Zones et al. |
| 5,869,706 A | * | 2/1999 | Dartt et al. .................. 549/531 |

\* cited by examiner

*Primary Examiner*—David Sample
(74) *Attorney, Agent, or Firm*—Richard J. Sheridan

(57) ABSTRACT

Crystalline molecular sieve SSZ-33 is prepared using a mixture comprising a N,N,N -trialkyl-8-ammonium-tricyclo [$5.2.1.0^{2,6}$]decane quaternary ammonium cation and a N,N-dialkyl-8-amino-tricyclo[$5.2.1.0^{2,6}$]decane compound.

19 Claims, No Drawings

PREPARATION OF MOLECULAR SIEVE SSZ-33

BACKGROUND

Crystalline molecular sieves are usually prepared from aqueous reaction mixtures containing sources of alkali or alkaline earth metal oxides, sources of silicon oxide, and, optionally, sources of, e.g., boron oxide and/or aluminum oxide.

Molecular sieves have been prepared from reaction mixtures containing an organic structure directing agent ("SDA"), usually a nitrogen-containing organic cation. U.S. Pat. No. 4,963,337, issued Oct. 16, 1990 to Zones, discloses that the molecular sieve designated SSZ-33 can be prepared using a tricyclo[5.2.1.0$^{2,6}$] decane quaternary ammonium cation SDA.

U.S. Pat. No. 5,785,947, issued Jul. 28, 1998 to Zones et al., discloses a method of preparing crystalline zeolites using a small quantity of an organic templating compound and a larger quantity of an amine component containing at least one amine having from one to eight carbon atoms, ammonium hydroxide, or mixtures thereof. It is disclosed that the amine component is preferably an aliphatic or cycloaliphatic amine containing no more than eight carbon atoms. Disclosed examples of the amine component are isopropylamine, isobutylamine, n-butylamine, piperidine, 4-methylpiperidine, cyclohexylamine, 1,1,3,3-tetramethyl-butylamine and cyclopentylamine.

U.S. Pat. No. 5,707,600, issued Jan. 13, 1998 to Nakagawa et al., discloses a process for preparing medium pore size zeolites using small, neutral amines capable of forming the zeolite, the amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom, wherein the process is conducted in the absence of a quaternary ammonium compound. Disclosed examples of the small, neutral amine are isobutylamine, diisobutylamine, trimethylamine, cyclopentylamine, diisopropylamine, sec-butylamine, 2,5-dimethylpyrrolidine and 2,6-dimethylpiperidine.

U.S. Pat. No. 5,707,601, issued Jan. 13, 1998 to Nakagawa, discloses a process for preparing zeolites having the MTT crystal structure using small, neutral amines capable of forming the zeolite, the amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom, wherein the process is conducted in the absence of a quaternary ammonium compound. Disclosed examples of the small, neutral amine are isobutylamine, diisobutylamine, diisopropylamine and trimethylamine.

SUMMARY OF THE INVENTION

In accordance with this invention there is provided a method for preparing a molecular sieve having a mole ratio of greater than about 15:1 of (1) silicon oxide, germanium oxide and mixtures thereof to (2) boron oxide or a mixture of boron oxide with aluminum oxide, gallium oxide, titanium oxide or iron oxide and mixtures thereof, and having, after calcination, the X-ray diffraction lines of Table II, said method comprising:

A. forming an aqueous reaction mixture comprising (1) a source of silicon oxide, germanium oxide and mixtures thereof; (2) a source of boron oxide or a mixture of boron oxide with aluminum oxide, gallium oxide, titanium oxide or iron oxide and mixtures thereof; (3) a source of alkali metal or alkaline earth metal; (4) an N,N,N-trialkyl-8-ammonium-tricyclo[5.2.1.0$^{2,6}$]decane quaternary ammonium cation, and (5) an N,N-dialkyl-8-amino-tricyclo[5.2.1.0$^{2,6}$]decane compound; and B. maintaining said aqueous mixture under sufficient crystallization conditions until crystals are formed.

The reaction mixture should have a composition in terms of mole ratios falling within the ranges shown in Table A below:

TABLE A

|  | Broad | Preferred |
|---|---|---|
| YO$_2$/W$_a$O$_b$ | 10–200 | 30–60 |
| OH$^-$/YO$_2$ | 0.10–1.0 | 0.20–0.30 |
| Q/YO$_2$ | 0.05–0.50 | 0.10–0.25 |
| M$^{n+}$/YO$_2$ | 0.05–0.30 | 0.05–0.15 |
| H$_2$O/YO$_2$ | 15–300 | 25–60 |
| Q/Q + M$^{n+}$ | 0.30–0.70 | 0.40–0.60 | where Y is silicon, germanium or a mixture thereof, W is boron, or a mixture of boron, aluminum, gallium, titanium, iron or mixtures thereof, a is 1 or 2, b is 2 when a is 1 (i.e., W is tetravalent), b is 3 when a is 2 (i.e., W is trivalent), M is an alkali metal or alkaline earth metal, n is the valence of M (i.e., 1 or 2), and Q is a mixture of a N,N,N-trialkyl-8-ammonium-tricyclo[5.2.1.0$^{2,6}$]decane quaternary ammonium cation and a N,N-dialkyl-8-amino-tricyclo[5.2.1.0$^{2,6}$] decane compound.

In one embodiment, the present invention provides these processes wherein the N,N,N-trialkyl-8-ammonium-tricyclo[5.2.1.0$^{2,6}$]decane quaternary ammonium cation is used in an amount less than that required to fill all of the micropore volume of the molecular sieve, i.e., an amount less than that required to crystallize the molecular sieve in the absence of the N,N-dialkyl-8-amino-tricyclo[5.2.1.0$^{2,6}$]decane compound. Typically, the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 and higher, for example 1:4 to about 4:1.

In accordance with this invention, there is also provided a molecular sieve having a composition, as-synthesized and in the anhydrous state, in terms of mole ratios as follows:

(1 to 5) Q: (0.1 to 1) Mn$^+$:W$_a$O$_b$: (greater than 15) YO$_2$ where Q, M, n, W, a, b and Y are as defined above.

The as-synthesized molecular sieve can have a boron content of greater than 100 parts per million by weight.

In one embodiment, the present invention provides the as-synthesized molecular sieve wherein the N,N,N-trialkyl-8-ammonium-tricyclo[5.2.1.0$^{2,6}$]decane quaternary ammonium cation is used in an amount less than that required to fill all of the micropore volume of the molecular sieve, i.e., an amount less than that required to crystallize the molecular sieve in the absence of the N,N-dialkyl-8-amino -tricyclo[5.2.1.0$^{2,6}$]decane compound. Typically, the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 and higher, for example about 1:4 to about 4:1.

There is further provided in accordance with this invention an improved method for preparing a molecular sieve from source materials for said molecular sieve and an organic structure directing agent, the improvement comprising employing a structure directing agent comprising a mixture of an N,N,N-trialkyl-8-ammonium-tricyclo[5.2.1.0$^{2,6}$]decane quaternary ammonium cation, and an N,N-dialkyl-8-amino-tricyclo[5.2.1.0$^{2,6}$]decane compound.

In one embodiment, the present invention provides this improved method wherein the N,N,N-trialkyl-8-ammonium-tricyclo[5.2.1.0$^{2,6}$]decane quaternary ammonium cation is used in an amount less than that required to fill all of the micropore volume of the molecular sieve, i.e., an amount less than that required to crystallize the molecular sieve in the absence of the N,N-dialkyl-8-amino -tricyclo[5.2.1.0$^{2,6}$] decane compound. Typically, the mole ratio of N,N,N-trialkyl-8-ammonium-tricyclo[5.2.1.0$^{2,6}$]decane quaternary ammonium cation to N,N-dialkyl-8-amino-tricyclo [5.2.1.0$^{2,6}$]decane compound is about 1:4 and higher, for example about 1:4 to about 4:1.

DETAILED DESCRIPTION

Molecular sieve SSZ-33 can be prepared by a method comprising preparing an aqueous mixture that contains a N,N,N-trialkyl-8-ammonium-tricyclo[5.2.1.0$^{2,6}$]decane quaternary ammonium cation, and a N,N-dialkyl-8-amino-tricyclo[5.2.1.0$^{2,6}$]decane compound. Typically, the mole ratio of N,N,N-trialkyl-8-ammonium-tricyclo[5.2.1.0$^{2,6}$]decane quaternary ammonium cation to N,N-dialkyl-8 -amino-tricyclo[5.2.1.0$^{2,6}$]decane compound is about 1:4 and higher, for example about 1:4 to about 4:1. Preferably, seeds of SSZ-33 are used in the preparation.

This invention provides considerable cost improvement over the use of a N,N,N-trialkyl-8-ammonium-tricyclo [5.2.1.0$^{2,6}$]decane quaternary ammonium cation SDA alone.

SSZ-33 molecular sieves can be suitably prepared from an aqueous reaction mixture containing sources of an alkali metal or alkaline earth metal oxide, sources of an oxide of silicon, germanium or mixtures thereof, sources of boron oxide or boron oxide and aluminum oxide, gallium oxide, titanium oxide or iron oxide and mixtures thereof, a N,N,N-trialkyl-8-ammonium-tricyclo[5.2.1.0$^{2,6}$]decane quaternary ammonium cation and a N,N-dialkyl-8-amino-tricyclo [5.2.1.0$^{2,6}$]decane compound. The mixture should have a composition in terms of mole ratios falling within the ranges shown in Table A below:

TABLE A

|  | Broad | Preferred |
| --- | --- | --- |
| $YO_2/W_aO_b$ | 10–200 | 30–60 |
| $OH^-/YO_2$ | 0.10–1.0 | 0.20–0.30 |
| $Q/YO_2$ | 0.05–0.50 | 0.10–0.25 |
| $M^{n+}/YO_2$ | 0.05–0.30 | 0.05–0.15 |
| $H_2O/YO_2$ | 15–300 | 25–60 |
| $Q/Q + M^{n+}$ | 0.30–0.70 | 0.40–0.60 | where Y is silicon, germanium or a mixture thereof; W is boron, or a mixture of boron, aluminum, gallium, titanium, iron or mixtures thereof; a is 1 or 2, b is 2 when a is 1 (i.e., W is tetravalent), b is 3 when a is 2 (i.e., W is trivalent), M is an alkali metal or alkaline earth metal; n is the valence of M (i.e., 1 or 2); and Q is a mixture of a N,N,N-trialkyl-8-ammonium-tricyclo[5.2.1.0$^{2,6}$]decane quaternary ammonium cation and a N,N-dialkyl-8-amino-tricyclo[5.2.1.0$^{2,6}$] decane compound.

The reaction mixture is prepared using standard molecular sieve preparation techniques. Sources of boron for the reaction mixture include borosilicate glasses and other reactive boron oxides. These include borates, boric acid and borate esters. Typical sources of silicon oxide include fumed silica, silicates, silica hydrogel, silicic acid, colloidal silica, tetra-alkyl orthosilicates, and silica hydroxides. Sources of other oxides, such as aluminum oxide, gallium oxide, titanium oxide or iron oxide are analogous to those for boron oxide and silicon oxide.

Mixture Q comprises a N,N,N-trialkyl-8-ammonium-tricyclo[5.2.1.0$^{2,6}$]decane quaternary ammonium cation and a N,N-dialkyl-8-amino-tricyclo[5.2.1.0$^{2,6}$]decane compound. The N,N,N-trialkyl-8-ammonium-tricyclo[5.2.1.0$^{2,6}$]decane quaternary ammonium cation has the formula

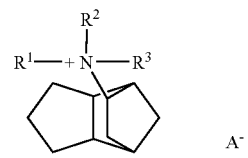

where $R^1$, $R^2$ and $R^3$ are each independently a lower alkyl, for example methyl. The cation is associated with an anion, $A^-$, which is not detrimental to the formation of the SSZ-33. Representative of such anions include halogens, such as fluoride, chloride, bromide and iodide; hydroxide; acetate; sulfate and carboxylate. Hydroxide is the preferred anion. It may be beneficial to ion exchange, for example, a halide for hydroxide ion, thereby reducing or eliminating the alkali metal or alkaline earth metal hydroxide required.

The N,N,N-trialkyl-8-ammonium-tricyclo[5.2.1.0$^{2,6}$]decane quaternary ammonium cation can be synthesized in the manner described in Example 1 of aforementioned U.S. Pat. No. 4,963,337 which is incorporated herein by reference in its entirety.

The N,N-dialkyl-8-amino-tricyclo[5.2.1.0$^{2,6}$]decane compound has the formula

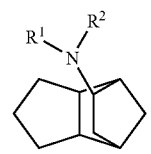

where $R^1$ and $R^2$ are as defined above. Synthesis of the N,N-dialkyl-8-amino-tricyclo[5.2.1.0$^{2,6}$]decane compound is also described in U.S. Pat. No. 4,963,337, the N,N-dialkyl-8-amino-tricyclo[5.2.1.0$^{2,6}$]decane compound being an intermediate for the N,N,N-trialkyl-8-ammonium-tricyclo[5.2.1.0$^{2,6}$]decane quaternary ammonium cation.

Mixture Q typically has a mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound of about 1:4 and higher, for example about 1:4 to about 4:1.

Use of a N,N-dialkyl-8-amino-tricyclo[5.2.1.0$^{2,6}$]decane compound in mixture Q permits a reduction in the amount of N,N,N-trialkyl-8-ammonium -tricyclo[5.2.1.0$^{2,6}$]decane quaternary ammonium cation used in mixture Q, which results in significant cost savings. In fact, it has been found that, by using a N,N-dialkyl-8-amino-tricyclo[5.2.1.0$^{2,6}$]decane compound in mixture Q, the amount of N,N,N-trialkyl-8-ammonium-tricyclo[5.2.1.0$^{2,6}$]decane quaternary ammonium cation can be reduced to a level below that which is required to fill the micropore volume of SSZ-33, i.e., an amount less than that required to crystallize SSZ-33 in the absence of the N,N-dialkyl-8-amino-tricyclo[5.2.1.0$^{2,6}$]decane compound.

The reaction mixture can be seeded with SSZ-33 crystals both to direct and accelerate the crystallization, as well as to minimize the formation of undesired contaminants. Typically, when seeds are employed they are used in an amount which is about 2–3 weight percent based on the weight of silicon oxide in the reaction mixture.

The reaction mixture is maintained at an elevated temperature until crystals of SSZ-33 are formed. The temperatures during the hydrothermal crystallization step are typically maintained from about 140° C. to about 200° C., preferably from about 150° C. to about 170° C., and most preferably from about 155° C. to about 165° C. The crystallization period is typically greater than 1 day and preferably from about 3 days to about 7 days.

The hydrothermal crystallization is conducted under pressure and usually in an autoclave so that the reaction mixture is subject to autogenous pressure. The reaction mixture can be stirred, such as by rotating the reactor, during crystallization. During the hydrothermal crystallization step, the SSZ-33 crystals can be allowed to nucleate spontaneously from the reaction mixture.

Once the SSZ-33 crystals have formed, the solid product can be separated from the reaction mixture by standard mechanical separation techniques such as filtration. The crystals can be water-washed and then dried, e.g., at 90° C. to 150° C. for from 8 to 24 hours, to obtain the as-synthesized SSZ-33 crystals. The drying step can be performed at atmospheric or subatmospheric pressures.

As used herein, the term "as-synthesized" means that the molecular sieve crystals have been recovered from the reaction mixture and still contain the SDA in their pores, i.e., the SDA has not been removed from the molecular sieve crystals by (typically) calcination. SSZ-33 molecular sieve has a composition, as-synthesized and in the anhydrous state, in terms of mole ratios as indicated in Table B below:

As-Synthesized SSZ-33 Composition

TABLE B

| (1 to 5) Q: (0.1 to 1) M$^{n+}$: W$_a$O$_b$: (greater than 15) YO$_2$ |
| --- | where Q, M, n, W, a, b and Y are as defined above.

As-synthesized SSZ-33 can have a boron content of greater than 100 parts per million.

SSZ-33 molecular sieves, as-synthesized, have a crystalline structure whose X-ray powder diffraction pattern shows the following characteristic lines:

As-Synthesized SSZ-33

TABLE I

| 2 Theta[a] | d spacing (Angstroms) | Intensity[b] |
| --- | --- | --- |
| 7.86 | 11.25 | VS |
| 20.48 | 4.336 | VS |
| 21.47 | 4.139 | M–S |
| 22.03 | 4.035 | VS |
| 23.18 | 3.837 | S–VS |
| 26.83 | 3.323 | M–S |

[a] ±0.1
[b] The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

Table IA below shows the characteristic X-ray powder diffraction lines of as-synthesized SSZ-33 including actual relative intensities.

As-Synthesized SSZ-33

TABLE IA

| 2 Theta[a] | d spacing (Angstroms) | Rel. Intensity (100 × I/I$_0$) |
| --- | --- | --- |
| 7.86 | 11.25 | 90 |
| 20.48 | 4.336 | 100 |
| 21.47 | 4.139 | 40 |
| 22.03 | 4.035 | 90 |
| 23.18 | 3.837 | 64 |
| 26.83 | 3.323 | 40 |

[a] ±0.1

SSZ-33 molecular sieves can be used as-synthesized or can be thermally treated (calcined). By "thermal treatment" is meant heating to a temperature from about 200° C. to about 820° C., either with or without the presence of steam. Usually, it is desirable to remove the alkali metal or alkaline earth metal cation by ion exchange and replace it with hydrogen, ammonium, or any desired metal ion. Thermal treatment including steam helps to stabilize the crystalline lattice from attack by acids.

After calcination, SSZ-33 molecular sieves have a crystalline structure whose X-ray powder diffraction pattern shows the characteristic lines as indicated in Table II below.

Calcined SSZ-33

TABLE II

| 2 Theta[a] | d spacing (Angstroms) | Intensity |
| --- | --- | --- |
| 7.81 | 11.32 | VS |
| 20.43 | 4.347 | M–S |
| 21.44 | 4.144 | W |
| 22.02 | 4.037 | M |
| 23.18 | 3.837 | M |
| 26.80 | 3.326 | M |

[a] ±0.1

Table IIA below shows the characteristic X-ray powder diffraction lines of calcined SSZ-33 including actual relative intensities.

Calcined SSZ-33

TABLE IIA

| 2 Theta[a] | d spacing (Angstroms) | Rel. Intensity (100 × I/I$_o$) |
|---|---|---|
| 7.81 | 11.32 | 100 |
| 20.43 | 4.347 | 46 |
| 21.44 | 4.144 | 9 |
| 22.02 | 4.037 | 41 |
| 23.18 | 3.837 | 28 |
| 26.80 | 3.326 | 31 |

[a] ±0.1

The X-ray powder diffraction patterns were determined by standard techniques. The radiation was the K-alpha/doublet of copper and a scintillation counter spectrometer with a strip-chart pen recorder was used. The peak heights I and the positions, as a function of 2 Theta where Theta is the Bragg angle, were read from the spectrometer chart. From these measured values, the relative intensities, 100× I/I$_o$, where I$_o$ is the intensity of the strongest line or peak, and d, the interplanar spacing in Angstroms corresponding to the recorded lines, can be calculated.

Variations in the diffraction pattern can result from variations in the silica-to-boron mole ratio from sample to sample. The molecular sieve produced by exchanging the metal or other cations present in the molecular sieve with various other cations yields a similar diffraction pattern, although there can be shifts in interplanar spacing as well as variations in relative intensity. Calcination can also cause shifts in the X-ray diffraction pattern. Notwithstanding these perturbations, the basic crystal lattice structure remains unchanged.

SSZ-33 molecular sieves are useful in hydrocarbon conversion reactions. Examples of these uses are described in U.S. Pat. No. 4,963,337, issued Oct. 16, 1990 to Zones, which is incorporated herein by reference.

EXAMPLES

Examples 1–8

In the following examples, "SDA 1" represents N,N,N-trimethyl-8-ammonium-tricyclo[5.2.1.0$^{2,6}$]decane hydroxide, and "SDA 2" is N,N-dimethyl-8-amino-tricyclo[5.2.1.0$^{2,6}$]decane. The following components were held constant: SiO$_2$ (Cabosil M-5 fumed silica, 97%), 1N NaOH, and boric acid. All runs shown were at the following mole ratios: H$_2$O/SiO$_2$=44, Na/SiO$_2$=0.10 and SiO$_2$/B$_2$O$_3$=12. Reactions were carried out at 160° C., 43 RPM tumbling on a spit within an enclosed, convection heated oven. Runs were 6–12 days.

| Ex. # | mM SDA 1 | mM SDA 2 | SiO$_2$ | XRD RESULT |
|---|---|---|---|---|
| 1 | 2.6 | 0 | 12 | SSZ-33 |
| 2 | 2.1 | 0.50 | 12 | SSZ-33 |
| 3 | 1.56 | 1.0 | 12 | SSZ-33 |
| 4 | 1.04 | 1.5 | 12 | SSZ-33 |
| 5 | 0.77 | 1.8 | 12 | SSZ-33, MIN. AMO |
| 6 | 0.52 | 2.0 | 12 | AMO > SSZ-33 |
| 7 | 0.26 | 2.22 | 12 | AMO > SSZ-33 |
| 8 | 0.00 | 2.5 | 12 | ONLY TRACE 33 |

Examples 1–8 demonstrate that as much as 75% of SDA 1 can be replaced with SDA 2 with some optimization of the conditions.

Example 9

The synthesis of SSZ-33 was carried out in a 1 gallon reactor using an overhead motor driven stirrer within the reactor. The following amounts of reagent were used in the preparation:

130 grams of 0.73M solution of SDA 1 (95 mM)
72 grams of SDA 2 (381 mM)
H$_2$O=1485 grams
Boric Acid=23.4 grams (189 mM B$_2$O$_3$)
1 N NaOH=234 grams (234 mM)
Cabosil M-5, fumed silica (97%)=140 grams (2.33 moles)
Seeds of SSZ-33=3.90 grams The reaction was brought to 160° C. using a 12 hour ramp up. The reactor was stirred at 75 RPM and allowed to run for 11 days. The reactor was cooled, a sample initially taken and washed and dried. The XRD data of the product showed it to be SSZ-33. The entire batch was then washed and dried and the same XRD data was obtained.

What is claimed is:

1. A method for preparing a molecular sieve having a mole ratio of greater than about 15:1 of (1) silicon oxide, germanium oxide and mixtures thereof to (2) boron oxide or a mixture of boron oxide with aluminum oxide, gallium oxide, titanium oxide or iron oxide and mixtures thereof, and having, after calcination, the X-ray diffraction lines of Table II, said method comprising:

A. forming an aqueous reaction mixture comprising (1) a source of silicon oxide, germanium oxide and mixtures thereof; (2) a source of boron oxide or a mixture of boron oxide with aluminum oxide, gallium oxide, titanium oxide or iron oxide and mixtures thereof; (3) a source of alkali metal or alkaline earth metal; (4) an N,N,N-trialkyl-8-ammonium-tricyclo[5.2.1.0$^{2,6}$]decane quaternary ammonium cation, and (5) an N,N-dialkyl-8-amino-tricyclo[5.2.1.0$^{2,6}$]decane compound; and B. maintaining said aqueous mixture under sufficient crystallization conditions until crystals are formed.

2. The method of claim 1 wherein the reaction mixture has a composition in terms of mole ratios falling within the ranges shown below:

| | |
|---|---|
| YO$_2$/W$_a$O$_b$ | 10–200 |
| OH$^-$/YO$_2$ | 0.10–1.0 |
| Q/YO$_2$ | 0.05–0.50 |
| M$^{n+}$/YO$_2$ | 0.05–0.30 |
| H$_2$O/YO$_2$ | 15–300 |
| Q/Q + M$^{n+}$ | 0.30–0.70. | where Y is silicon, germanium or a mixture thereof, W is boron, or a mixture of boron, aluminum, gallium, titanium, iron or mixtures thereof, a is 1 or 2, b is 2 when a is 1, b is 3 when a is 2, M is an alkali metal or alkaline earth metal, n is the valence of M, and Q is a mixture of a N,N,N-trialkyl-8-ammonium-tricyclo[5.2.1.0$^{2,6}$]decane quaternary ammonium cation and a N,N-dialkyl-8-amino-tricyclo [5.2.1.0$^{2,6}$]decane compound.

3. The method of claim 2 wherein the reaction mixture has a composition in terms of mole ratios falling within the ranges shown below:

| | |
|---|---|
| YO$_2$/W$_a$O$_b$ | 30–60 |
| OH$^-$/YO$_2$ | 0.20–0.30 |
| Q/YO$_2$ | 0.10–0.25 |
| M$^{n+}$/YO$_2$ | 0.05–0.15 |
| H$_2$O/YO$_2$ | 25–60 |
| Q/Q + M$^{n+}$ | 0.40–0.60. |

4. The method of claim 1 wherein the N,N,N-trialkyl-8-ammonium-tricyclo[5.2.1.0$^{2,6}$]decane quaternary ammonium cation is used in an amount less than that required to fill all of the micropore volume of the molecular sieve.

5. The method of claim 1 wherein the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 and higher.

6. The method of claim 5 wherein the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 to about 4:1.

7. The method of claim 1 wherein the amount of boron in the molecular sieve is greater than 100 parts per million.

8. A molecular sieve having a composition, as-synthesized and in the anhydrous state, in terms of mole ratios as follows:

(1 to 5) Q: (0.1 to 1)M$^{n+}$:W$_a$O$_b$:(greater than 15) YO$_2$ where Y is silicon, germanium or a mixture thereof, W is boron, or a mixture of boron, aluminum, gallium, titanium, iron or mixtures thereof, a is 1 or 2, b is 2 when a is 1, b is 3 when a is 2, M is an alkali metal or alkaline earth metal, n is the valence of M, and Q is a mixture of a N,N,N-trialkyl-8-ammonium-tricyclo[5.2.1.0$^{2,6}$]decane quaternary ammonium cation and a N,N-dialkyl-8-amino-tricyclo [5.2.1.0$^{2,6}$]decane compound.

9. The molecular sieve of claim 8 wherein the N,N,N-trialkyl-8-ammonium-tricyclo[5.2.1.0$^{2,6}$]decane quaternary ammonium cation is used in an amount less than that required to fill all of the micropore volume of the molecular sieve.

10. The molecular sieve of claim 8 wherein the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 and higher.

11. The molecular sieve of claim 10 wherein the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 to about 4:1.

12. The molecular sieve of claim 8 wherein the amount of boron in the molecular sieve is greater than 100 parts per million.

13. The molecular sieve of claim 8 wherein the molecular sieve has, after calcination, the X-ray diffraction lines of Table II.

14. An improved method for preparing a molecular sieve from source materials for said molecular sieve and an organic structure directing agent, the improvement comprising employing a structure directing agent comprising a mixture of an N,N,N-trialkyl-8-ammonium-tricyclo [5.2.1.0$^{2,6}$]decane quaternary ammonium cation, and an N,N-dialkyl-8-amino-tricyclo[5.2.1.0$^{2,6}$]decane compound.

15. The method of claim 14 wherein the N,N,N-trialkyl-8-ammonium-tricyclo[5.2.1.0$^{2,6}$]decane quaternary ammonium cation is used in an amount less than that required to fill all of the micropore volume of the molecular sieve.

16. The method of claim 14 wherein the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 and higher.

17. The method of claim 16 wherein the mole ratio of N,N,N-trialkyl-8-ammonium-tricyclo[5.2.1.0$^{2,6}$]decane quaternary ammonium cation to N,N-dialkyl-8-amino-tricyclo[5.2.1.0$^{2,6}$]decane compound is about 1:4 to about 4:1.

18. The method of claim 14 wherein the amount of boron in the molecular sieve is greater than 100 parts per million.

19. The method of claim 14 wherein the molecular sieve has, after calcination, the X-ray diffraction lines of Table II.

\* \* \* \* \*